April 29, 1947. R. H. JAMES 2,419,838
NESTING CHAIR
Filed Dec. 15, 1941 9 Sheets-Sheet 1
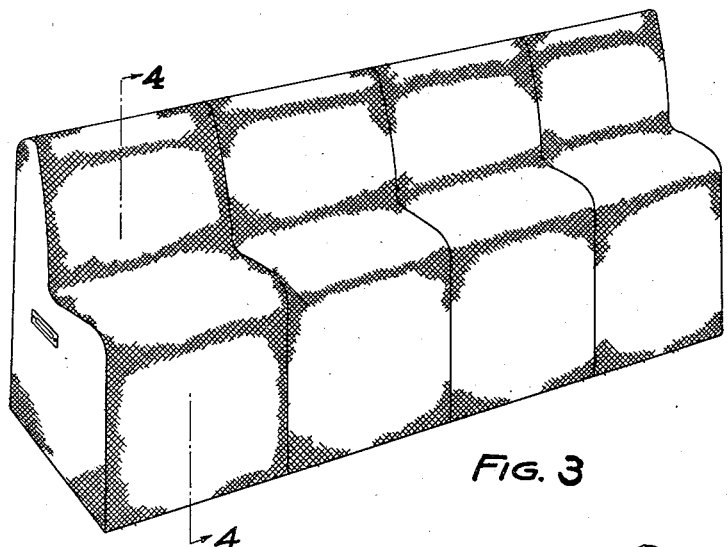
FIG. 3
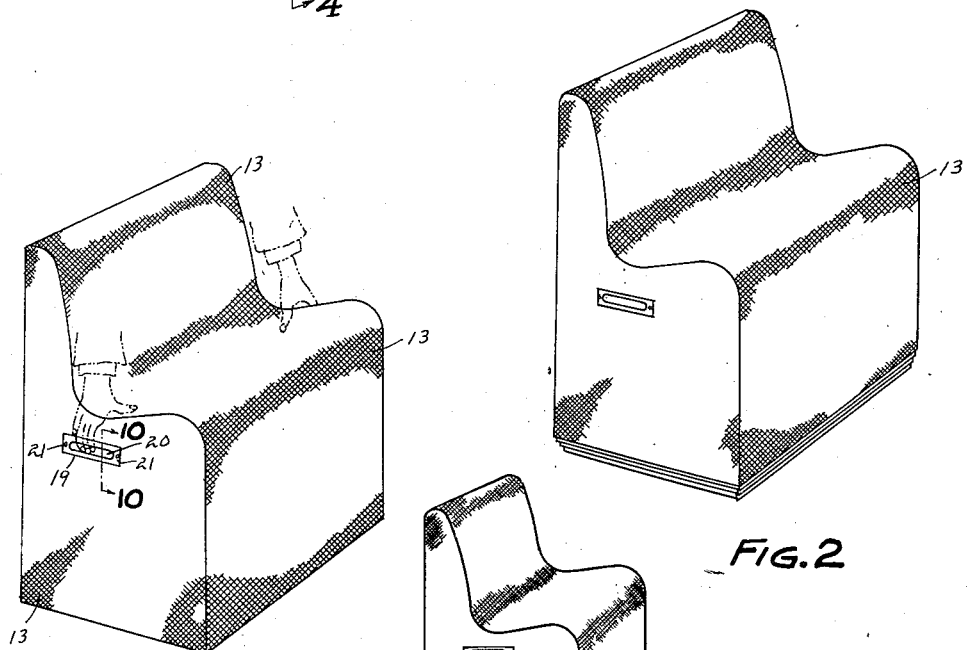
FIG. 1
FIG. 2
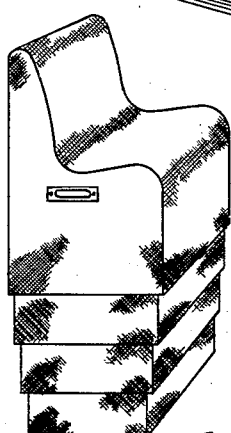
FIG. 3A
INVENTOR.
Robert H. James
By Harry P. Canfield
ATTORNEY.

April 29, 1947.  R. H. JAMES  2,419,838
NESTING CHAIR
Filed Dec. 15, 1941  9 Sheets-Sheet 2
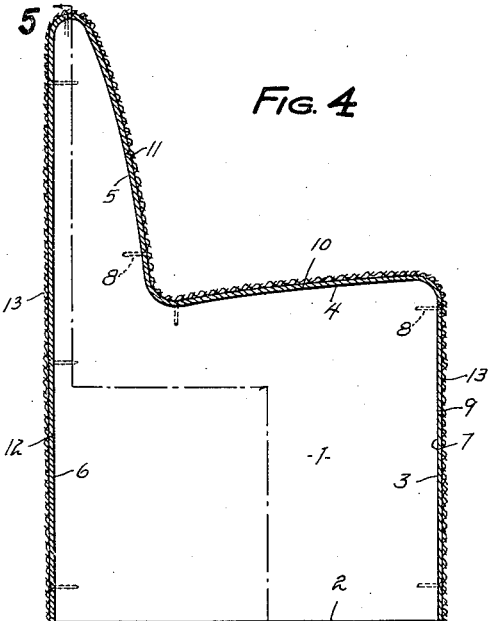
FIG. 4
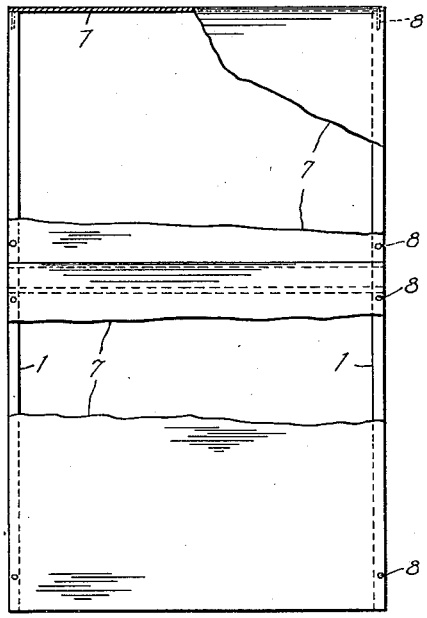
FIG. 6
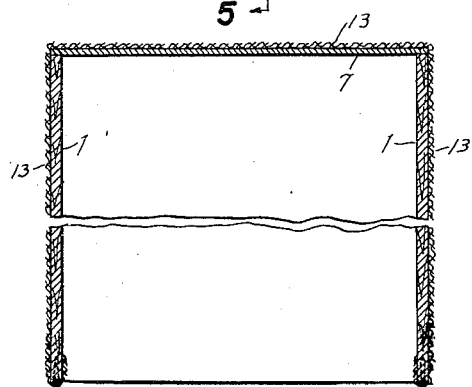
FIG. 5
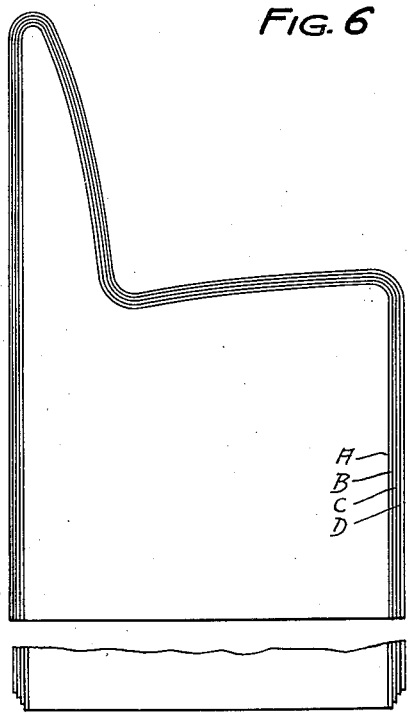
FIG. 7
FIG. 8
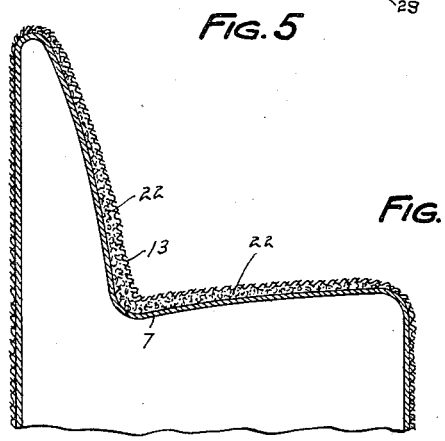
FIG. 9
INVENTOR.
Robert H. James
BY Harry R. Canfield
ATTORNEY.

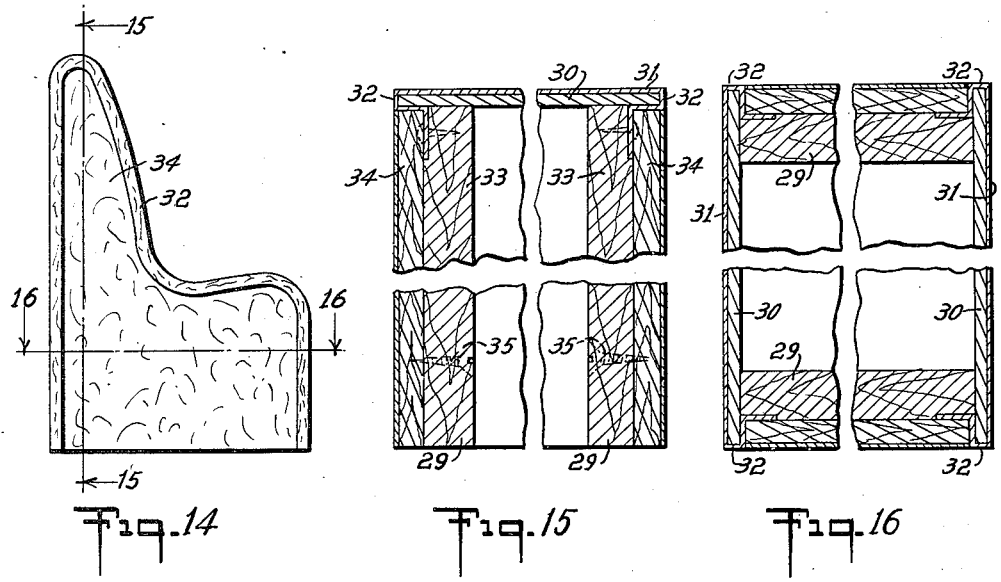
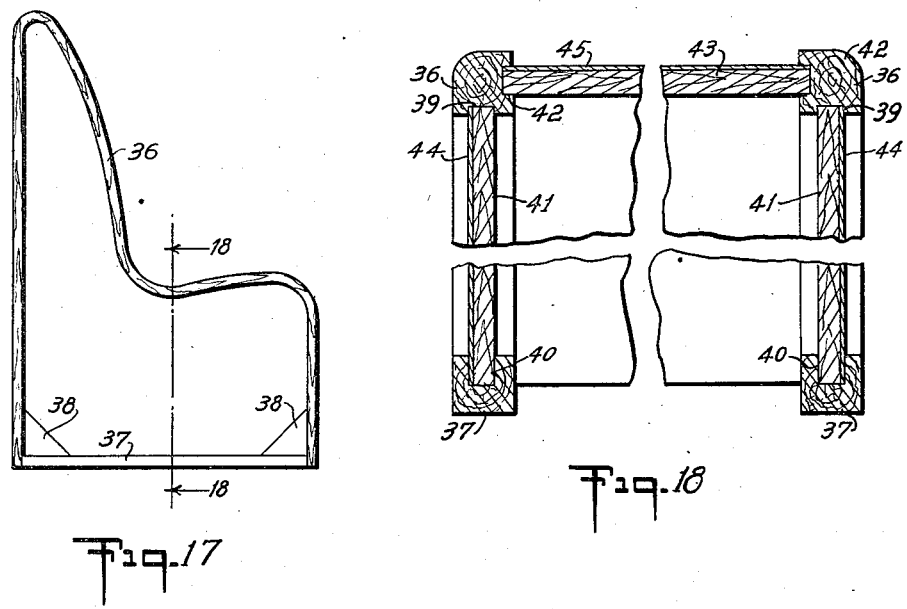

April 29, 1947.  R. H. JAMES  2,419,838
NESTING CHAIR
Filed Dec. 15, 1941  9 Sheets-Sheet 5

INVENTOR
ROBERT H. JAMES
BY
Harry P. Canfield
ATTORNEY

April 29, 1947.  R. H. JAMES  2,419,838
NESTING CHAIR
Filed Dec. 15, 1941  9 Sheets-Sheet 6

INVENTOR
ROBERT H. JAMES
BY Harry P. Canfield
ATTORNEY

April 29, 1947.  R. H. JAMES  2,419,838
NESTING CHAIR
Filed Dec. 15, 1941  9 Sheets-Sheet 7

INVENTOR.
Robert H. James
BY Harry P. Canfield
ATTORNEY.

April 29, 1947. R. H. JAMES 2,419,838
NESTING CHAIR
Filed Dec. 15, 1941 9 Sheets-Sheet 8

INVENTOR.
Robert H. James
BY Harry P. Canfield
ATTORNEY.

April 29, 1947.    R. H. JAMES    2,419,838
NESTING CHAIR
Filed Dec. 15, 1941    9 Sheets-Sheet 9

INVENTOR.
Robert H. James
Harry P. Canfield
BY    ATTORNEY.

Patented Apr. 29, 1947

2,419,838

UNITED STATES PATENT OFFICE 2,419,838

NESTING CHAIR

Robert H. James, South Euclid, Ohio, assignor, by mesne assignments, to A. M. Albert Application December 15, 1941, Serial No. 423,092

14 Claims. (Cl. 155—2)

1

This invention relates to articles of furniture, such for example as chairs, and particularly to such furniture which is made in units, a number of which may be nested one within the other.

The invention has particular advantages when embodied in a set of mutually nesting chairs, for example a bridge set, and that particular embodiment of the invention is illustrated and described herein, but as will be apparent hereinafter the invention may be applied to other classes of furniture than chairs.

Heretofore, for the sake of economy of space, chairs have been constructed so that they can be folded up or collapsed when not in use; and in some cases have been made so as to partially nest one within another for stacking or storing when not in use. The primary use of such chairs is to seat a number of people in an audience or other gathering, after which the chairs are stored away out of use.

Such prior chairs, because of the features of mechanical construction which render them collapsible or partially nestable, have been necessarily unsightly and without decorative properties and therefore not suitable for ordinary use for example in the modern home, or office; and furthermore, so far as I am aware, no nesting chair has been proposed which can be used as an ordinary chair when nested with other chairs.

It is therefore the primary object of this invention to provide generally an improved construction of nesting chair or the like.

Other objects are:

To provide a chair constructed so that its external appearance may have esthetic properties and therefore be suitable for regular continuous use in a modern home, and which may have nested therewith a number of similar or, if desired, substantially identical chairs;

To provide a chair which may be made up in sets of a small number such for example as two, three or four, and constructed so that when desired they may all be nested within and substantially completely covered and concealed by one chair of the set, and then said one chair used as an ordinary chair, but which upon occasion may be unnested to provide a set of chairs;

To provide a set of chairs which may nest one within another and all of them within an outer one of the set, and each of which has the form of a downwardly open shell whereby the nesting and unnesting thereof is accomplished by merely telescoping one chair upon another or untelescoping it therefrom;

To provide a set of chairs suitable for home use

2 and having an upholstered external appearance and of such form that one may be nested and covered by another, or all of them nested and covered by one of the set;

To provide a set of chairs, which because of nesting properties, may be used as one, two, three or more chairs, any one of which when not in use, being covered and concealed by another and each of which is formed so that it has a finished esthetic appearance suitable for ordinary use in a home;

To provide a construction of chair adapting it to the nesting unit purposes set forth above.

Other objects will be apparent to those skilled in the art to which my invention appertains.

My invention is fully disclosed in the following description taken in connection with the accompanying drawing in which:

Fig. 1 is a perspective view illustrating my invention embodied in a set of four chairs, only an outer chair of the set being visible, the others being nested with and concealed within the outer one;

Fig. 2 is a view similar to Fig. 1 illustrating the appearance of the set of four nested chairs when a modification feature which I may employ is utilized;

Fig. 3 is a perspective view illustrating the four chairs of the set after they have been unnested, and arranged in the form of a settee, as an illustrative manner of use;

Fig. 3A is a perspective view illustrating the manner in which the chairs of the set nest with each other;

Fig. 4 is a vertical sectional view of one of the chairs of Fig. 3, and the view may be considered as taken from the plane 4—4 of Fig. 3;

Fig. 5 is a sectional view taken from the plane 5—5 of Fig. 4;

Fig. 6 is an elevational view taken from the front of one of the chairs while in the process of being constructed and illustrating certain process steps;

Fig. 7 is a view somewhat diagrammatic to simplify the figure and illustrating the manner in which the set of four chairs of Fig. 1 nest within each other;

Fig. 8 is a fragmentary view similar to Fig. 7 illustrating the nesting of the set of chairs of Fig. 2;

Fig. 9 is a fragmentary view similar to a part of Fig. 4 illustrating a modification;

Fig. 14 is a side elevational view of a chair embodying my invention and having a construction different from that of Figs. 4 to 13;

Figure 19:
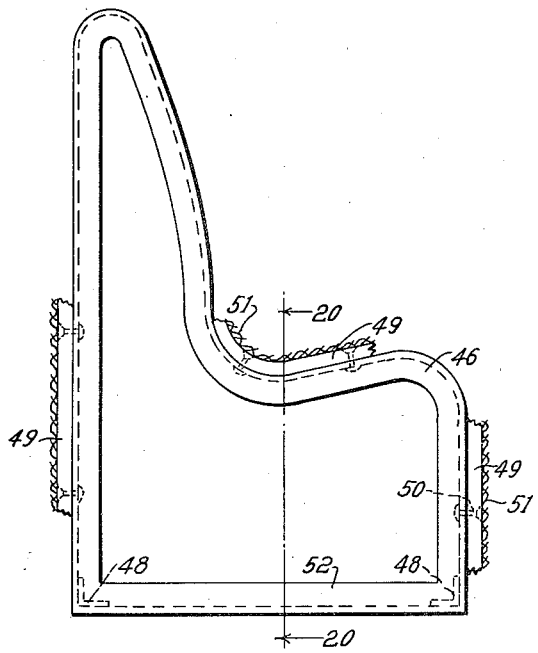
Figure 20:
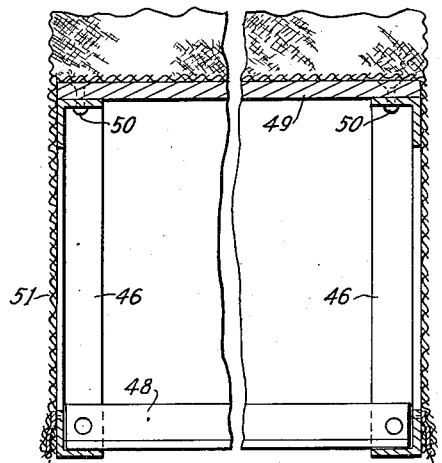
Figure 21:
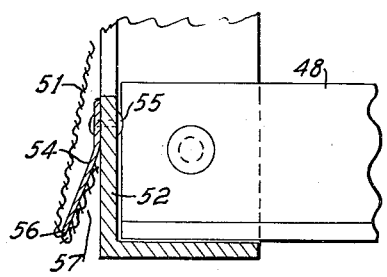
Figure 22:
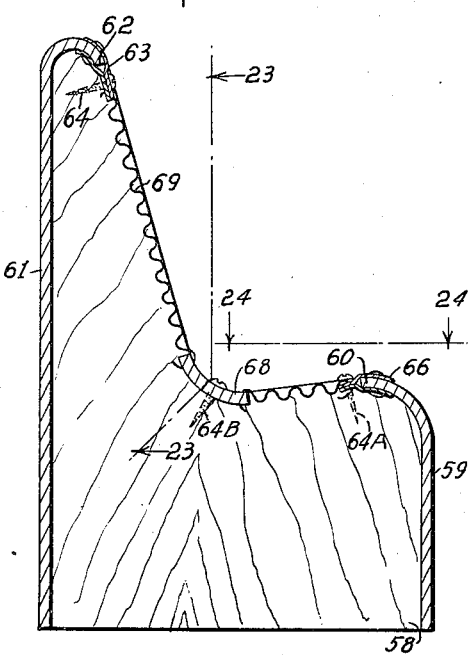
Figure 23:
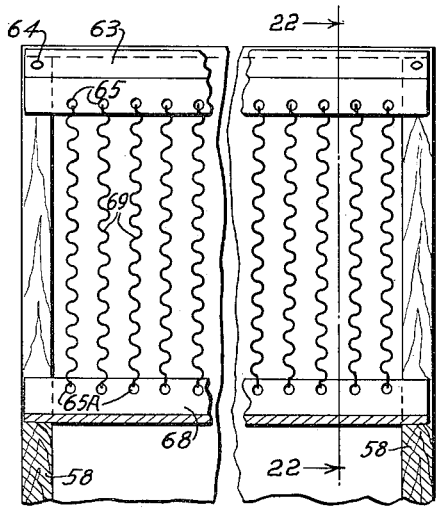
Figure 24:
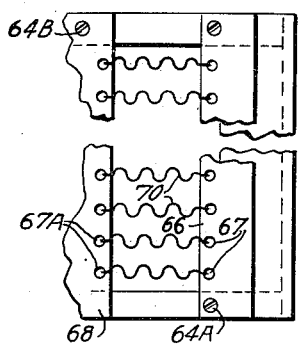
Figure 29:
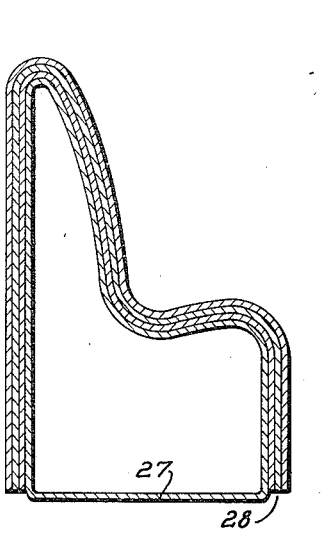
Figure 30:
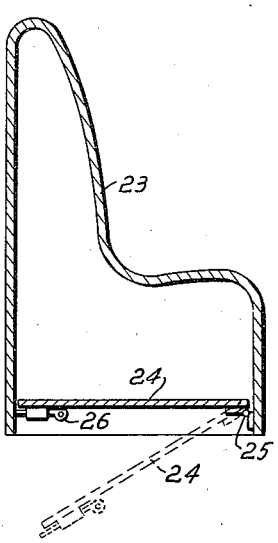
Figure 31:
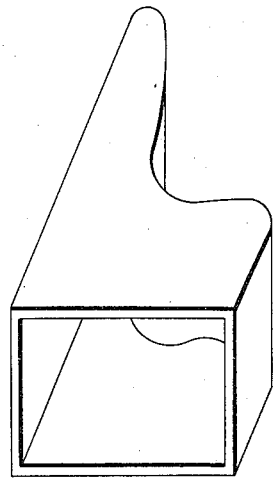
Figure 25:
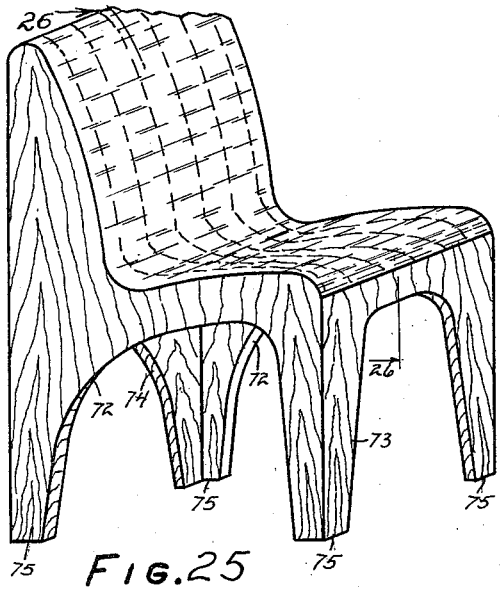
Figure 26:
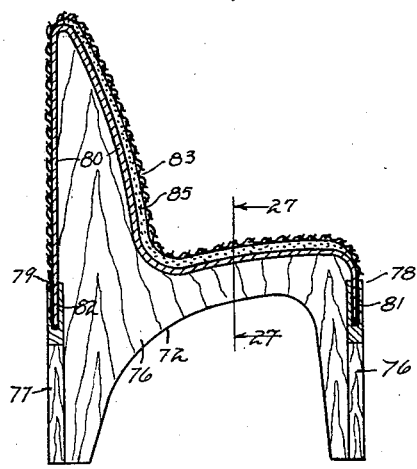
Figure 27:
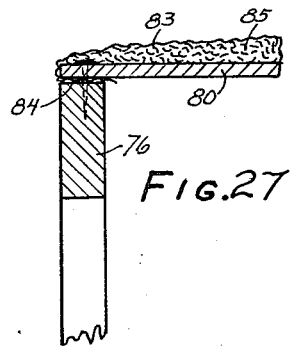
Figure 28:
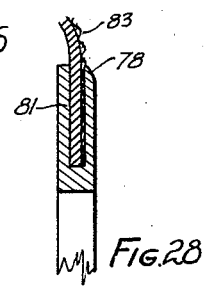
Figure 41:
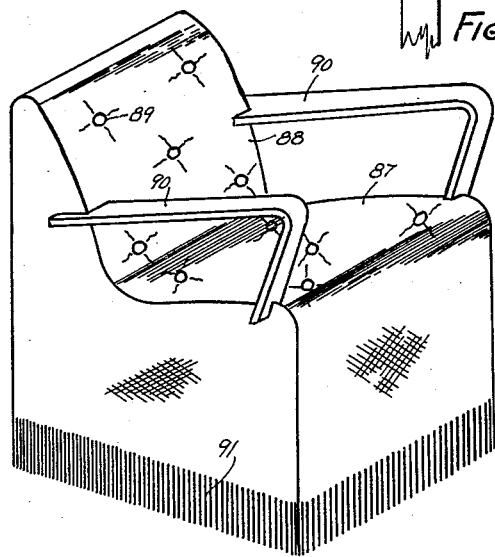
Figure 42:
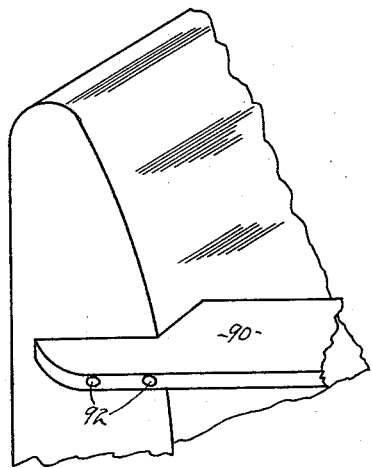
Figure 33:
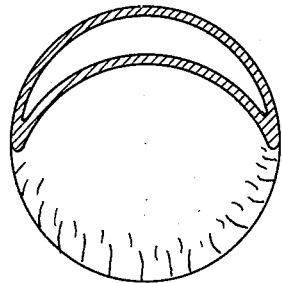
Figure 32:
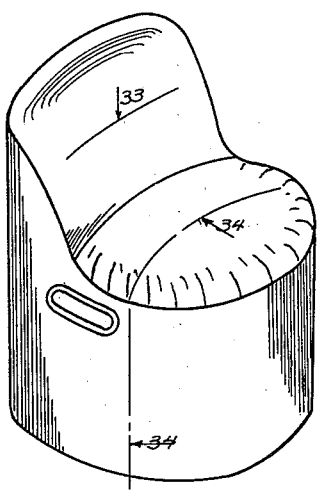
Figure 34:
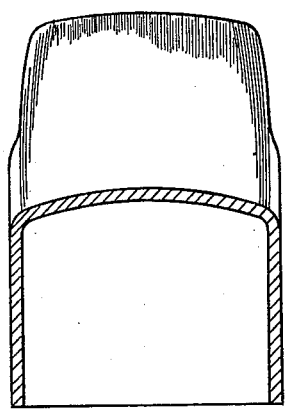
Figure 35:
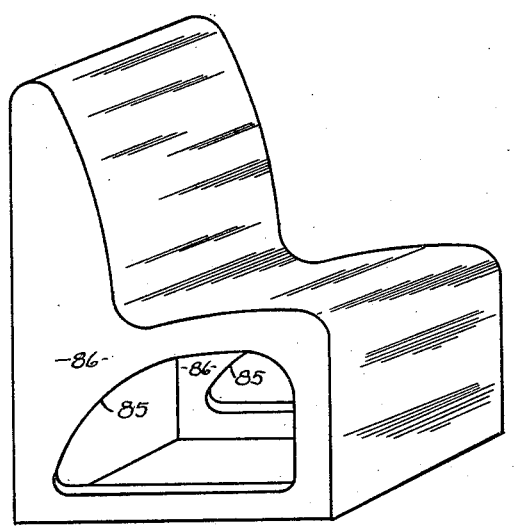
Figure 36:
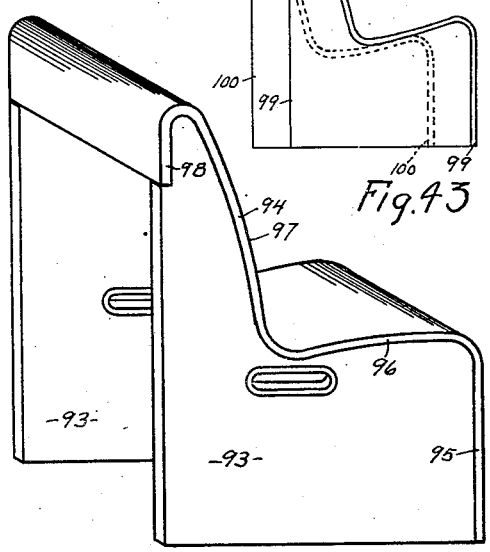
Figure 40:
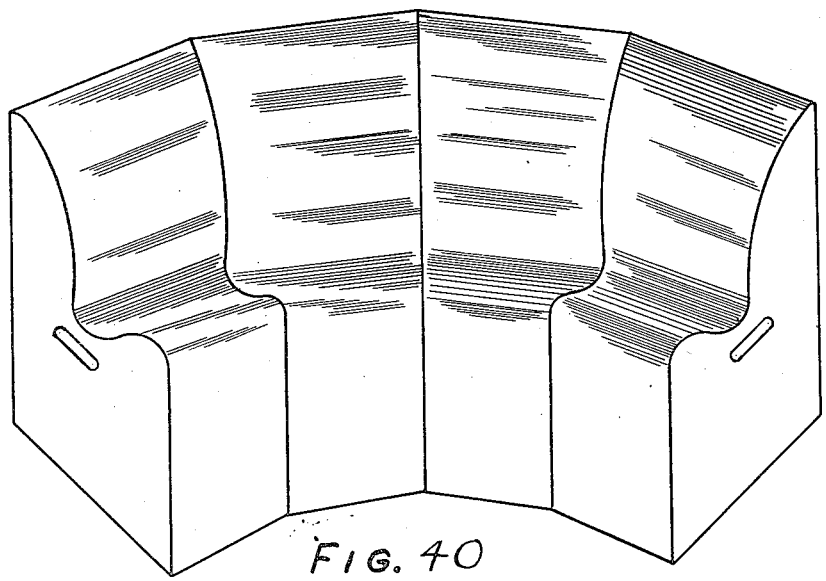
Figure 38:
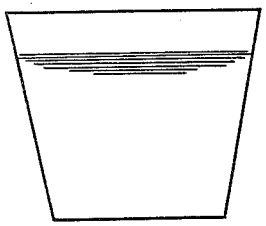
Figure 39:
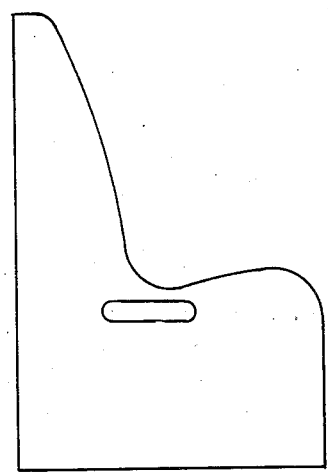
Figure 37:
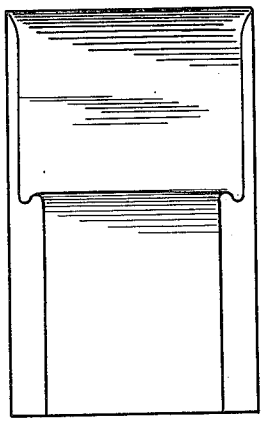

Figs. 15 and 16 are respectively sectional views, with parts broken away, taken respectively from the planes 15—15 and 16—16 of Fig. 14 and drawn to a larger scale;

Fig. 17 is a side elevational view illustrating a part of the frame of a chair of still another form of construction which I may employ;

Fig. 18 is a sectional view taken from the plane 18—18 of Fig. 17 and to enlarged scale, and with parts broken away, and with construction features added which have been omitted from Fig. 17;

Fig. 19 is a side elevational view illustrating another form of chair frame which I may employ and illustrating fragmentarily some of the parts as applied to the frame;

Fig. 20 is a sectional view to enlarged scale with parts broken away, the view being taken from the plane 20—20 of Fig. 19 and with parts added which are omitted in Fig. 19;

Fig. 21 is a fragmentary view to still larger scale of a part of Fig. 20 and illustrating a step of the construction process of making the chair;

Fig. 22 is a side elevational view of another chair frame construction which I may employ, the view being shown in longitudinal section and the view may be referred to the sectional plane 22—22 of Fig. 23;

Fig. 23 is a fragmentary sectional view taken from the plane 23—23 of Fig. 22;

Fig. 24 is a fragmentary view taken from the plane 24 of Fig. 22;

Fig. 25 is a perspective view illustrating the embodiment of my invention in a chair of a form having legs;

Fig. 26 is a longitudinal sectional view to slightly reduced scale taken from the plane 26—26 of Fig. 25 and illustrating one form of construction for the chair of Fig. 25;

Fig. 27 is a fragmentary sectional view taken from the plane 27—27 of Fig. 26 and drawn to a larger scale;

Fig. 28 is a fragmentary view of a part of Fig. 26 to enlarged scale;

Fig. 29 is a longitudinal sectional view in some respects diagrammatic, illustrating a set of nesting chairs the innermost one of which embodies a modification;

Fig. 30 is a longitudinal sectional view in some respects diagrammatic of the innermost one of a set of chairs and illustrating another modification;

Fig. 31 is a perspective view illustrating a preformed chair covering and cushioning element which I may employ;

Fig. 32 is a perspective view illustrating a nesting chair embodying my invention and of another general form, the plan contour of which is generally circular as distinguished from the more rectangular chairs of other forms;

Figs. 33 and 34 are respectively sectional views taken from the planes 33 and 34 of Fig. 32;

Fig. 35 is a perspective view illustrating another form of chair embodying my invention;

Fig. 36 is a perspective view illustrating still another form of chair of my invention and having a mode of operation in some respects different from that of the chairs of the other forms;

Fig. 37, Fig. 38, and Fig. 39 are respectively front elevational, top plan, and side elevational views of another form of nesting chair embodying my invention, the general plan contour of the chair being that of a trapezium;

Fig. 40 is a perspective view illustrating a set of chairs of the form of Figs. 37, 38, and 39 after being unnested and arranged in the form of a settee;

Fig. 41 is a perspective view illustrating another form which I may employ for the outermost chair of a set of chairs;

Fig. 42 is a fragmentary perspective view illustrating to enlarged scale a part of the chair of Fig. 41;

Fig. 43 is a view illustrating a part of the manner of nesting chairs having the form of Fig. 36.

The set of chairs embodying my invention, when all or some of them have been nested together, may have the general external appearance shown in Fig. 1 and when unnested may be placed in any desired floor arrangement, of which Fig. 3 illustrates a group of unnested chairs arranged as a settee. The outside appearance of the chairs, whether nested or unnested, may be variously modified and the chairs may be variously constructed as will hereinafter appear.

The chairs of Figs. 1 and 3 may for example be constructed as illustrated in Figs. 4 to 13 inclusive.

For this type of construction I provide a pair of spaced apart side walls 1—1 which conveniently may be made by sawing or punching them out of plywood board or other board or sheet material; plywood ½" thick being suitable.

The peripheral contour of the sides 1—1 is made to provide a bottom edge portion 2, a front edge portion 3, a seat edge portion 4, a back-rest edge portion 5, and a back edge portion 6.

These side walls 1—1 are set up in spaced-apart relation, and a strip of flexible sheet material 7, which may be sheet metal, but which preferably is sheet material of the fiber board type such as commercial "Randallite," and approximately ⅛" thick, is then bent to conform to and laid upon the said edge portions of the side walls and secured thereto for example by nails or screws as indicated for some of them at 8—8.

The sheet material 7, when thus mounted on the side walls 1—1, provides a front wall portion 9, a seat wall portion 10, a back-rest wall portion 11, and a back wall portion 12; which portions together with the side walls 1—1 constitute a complete chair frame in the form of a downwardly open hollow shell.

If neatly made and suitably finished externally, for example with lacquer, this shell frame can be used in this state as a unit chair of a set of nesting chairs as contemplated by my invention; but I prefer to cover or upholster it to improve the comfort thereof to the user, and to improve its esthetic appearance, and make it harmonize with the draperies and other furnishings of a modern home.

To this end, I make an over-all cover 13 of suitable upholstering material, which may be fabric, leather, artificial leather, etc. The cover 13 is preferably made from pieces stitched or otherwise fastened together to form a single unit of the nature of a "slip-cover" and of such form as to conform to the outside surfaces 9—10—11—12, on the frame as well as the side walls, and so that it will cover the said exterior surfaces of the chair frame.

The cover 13 may be secured to the frame by any desired or suitable means, for example by upholsterer's tacks, not shown, on upper portions of the frame, but I prefer to secure it by means which is not readily visible when the chair is standing on the floor, and to this end I secure it only to the bottom peripheral edge composed of the lower edges of the side, front, and back walls for example by folding it over the bottom edge and securing it thereto by tacks as indicated at 29, in Fig. 5.

Figure 11:
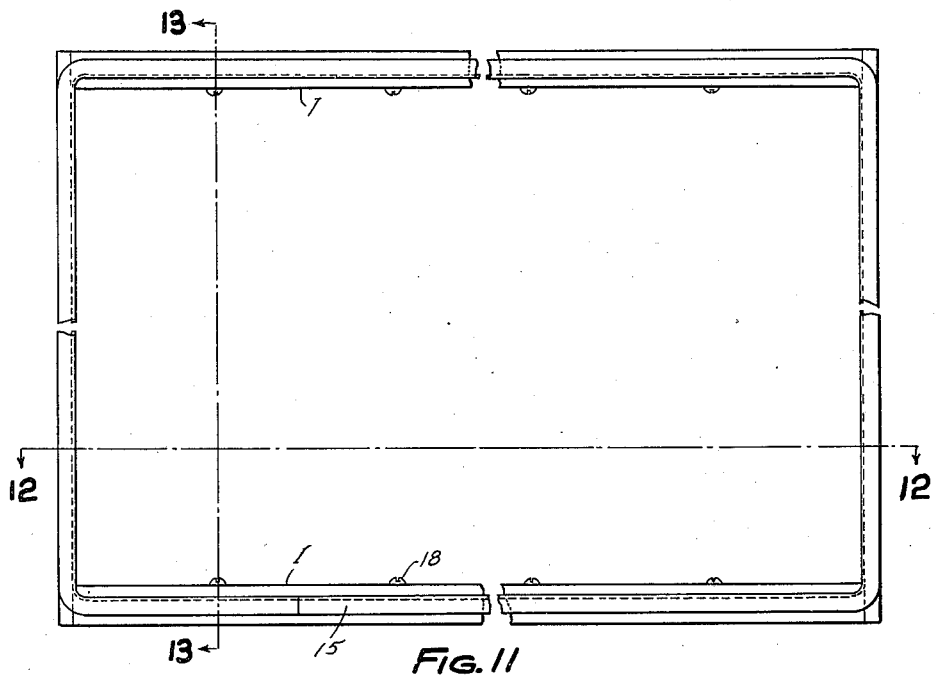
Fig. 11 is a bottom view of one of the chairs of the set showing the preferred means for attaching and securing chair covering or upholstering material.
Figure 12:
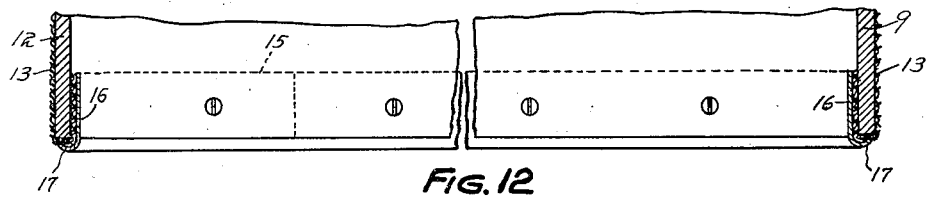
Fig. 12 is a view taken from the plane 12—12 of Fig. 11.
Figure 13:
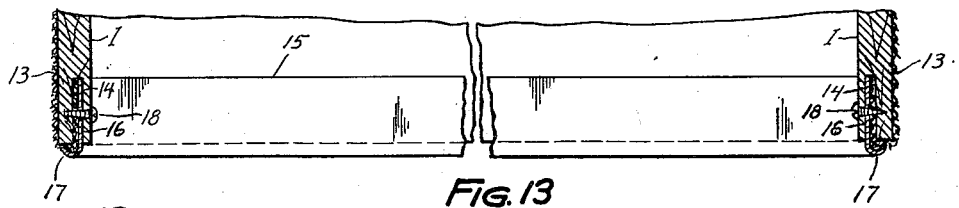
Fig. 13 is a view taken from the plane 13—13 of Fig. 11.
Figure 10:
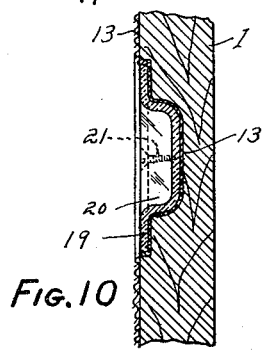
Fig. 10 is a fragmentary view, to enlarged scale, taken from the plane 10—10 of Fig. 1 and illustrating a hand grip.

The preferred securing means however is shown in Figs. 11, 12, and 13. Grooves 14—14 are provided in the bottom edge of the side walls 1—1 such as can be made by a saw cut. A strip 15 of metal of angle section, having a long flange 16 and a short flange 17 is cut off to suitable length and bent, as shown in Fig. 11 to the shape of the bottom peripheral edge. The long leg 16 of the strip is disposed to enter with clearance into the grooves 14—14 of the sides 1—1, and to lie adjacent to the inside surfaces of the front and back walls. The covering material overlaps the bottom peripheral edge of the frame and is inserted into the grooves, and lies upon the inner surfaces of the front and back walls. When the said metal strip is applied, the long leg 16 is pressed into the grooves 14—14 and together with the material in the groove fills the groove tightly, and the long leg 16 on the inside of the front and back walls also holds the material tightly between it and the said walls. The short flange overlaps the material on the bottom peripheral edge. Thus the material is firmly secured around and under the bottom edge.

The short flange 17 thus lies below the said bottom edge of the frame and the covering thereon so that it serves as a metal contact surface between the chair and the floor whereby the chair will slide readily on the floor. The long flange 16 may be retained in the grooves 14 by tacks, nails, screws or the like as indicated at 18, Fig. 13, if desired.

The cover 13 may readily be removed for cleaning purposes or to replace it with another by loosening and removing the metal strip 15.

The chair as thus finished and covered is in the form of a hollow, thin-walled, downwardly open shell as will be observed, the lower part of the shell being in effect a skirt terminating in a bottom peripheral edge for resting upon the floor.

The other chairs of the set may be made by the same process as that described above, and are successively of slightly smaller over-all dimensions, that is to say, smaller by the thickness of the shell wall. Because of the construction above-described, the hollow interior of the shell is substantially of the same form as the exterior, so that the exterior of one chair will telescope or nest into the interior of another and be covered and concealed thereby. This nesting feature is illustrated diagrammatically in Fig. 7, where four chairs of a set are indicated at A—B—C—D respectively, and is indicated in Fig. 3A.

It may in some cases be desired to have all of the chairs of the set of the same height from the floor to the seat, and they may be so constructed, in which case, as will be understood, when they are all nested together, the innermost one only will rest upon the floor, and the outer ones will each be slightly spaced from the floor at their bottom peripheral edges; and this is indicated in Figs. 2 and 8.

To facilitate telescoping and untelescoping the chairs, one with respect to another, handles or grips may be provided, preferably on the exterior side walls of the chairs. The preferred form of such hand grip, see Figs. 1 and 10, comprises a plate 19 molded from plastic material, for example transparent material, having a shallow cup-like recess 20 to receive the fingers of the user. The cup-like recess as well as the plate may be sunk into the side wall 1 and secured thereto by screws 21—21 so that the hand grip will be flush with the adjacent surface of the cover and will not drag upon a chair while being telescoped over it.

In some cases it may be desired to pad the back-rest and seat; and this is shown in Fig. 9 where upholstery pad material 22—22 such as cotton, sponge rubber, etc. is interposed between the cover 13 and the strip 7; and it may be secured in place by any suitable means known to those skilled in the art.

In Fig. 31 I have shown another means by which not only the seat and back rest may be upholstered or rendered soft and resilient for comfort, but by which the entire outer surface of the chairs, or any of them, may be given a soft yielding character to add to their attractiveness. In Fig. 31 is illustrated a device in the nature of a pre-formed slip cover. It may be made from sponge rubber, or cotton, or material known in the trade as "air-foam," or other suitable material, and may be molded all in one piece or be fabricated from pieces secured together and of any desired thickness. Such a soft cover will have the effect of deadening the hollow sound which otherwise might be emitted from the hollow chair construction upon impact therewith, when the interior frame thereof is relatively rigid. A deadening soft slip cover having these characteristics may also be provided for any of the other form of constructions of chairs hereinafter described.

While in the foregoing all of the chairs that nest are illustrated and described as of hollow shell form, it will be apparent that the innermost chair of the nesting set may be of the more conventional or non-hollow type and therefore may be of a completely "over-stuffed" type of chair.

Also if desired, the innermost chair of the nesting set, when hollow, may be used as a storage space for cushions, foot rests, or games equipment, etc. and a modification of this type is illustrated in Fig. 30. Here the chair is diagrammatically shown in longitudinal section at 23, as being all in one piece to simplify the drawing, and a door 24 is hinged as at 25 to the inner wall of the chair and has a latch 26 for holding it in generally horizontal position to support articles within the chair. The door may be unlatched and hingingly moved outwardly as illustrated in dotted line in the figure to give access to the storage interior.

Again, the innermost chair, as a further modification, may be provided with the feature illustrated in Fig. 29. In this figure four nesting chairs are illustrated somewhat diagrammatically, being shown in longitudinal section and each as all of one piece to simplify the drawing, and the innermost chair has a bottom 27 substantially closing the hollow shell thereof; and in the nested arrangement of the chairs as illustrated, the bottom 27 projects slightly below the bottom peripheral edges 28 of the other chairs of the set, whereby the weight of the entire set is supported by the large area of the bottom 27 of the innermost chair. This avoids the possibility that the bottom peripheral edge or edges of the chairs, which would otherwise rest directly upon a carpeted floor, might, after a period of time, leave an indentation in the nap of the carpet.

As will now be apparent, when all of the chairs are telescoped within one chair, they will appear as in Fig. 1, and may be used as a regular ordinary chair; and when two chairs are wanted the outer one may be removed and used as before and the next under it used as a chair, and so on as more and more chairs are wanted until the whole set is in use.

To remove or untelescope a chair, the grips 19 may be grasped as indicated in Fig. 1 and each chair except the innermost one may be provided with such grips; and the telescoping and untelescoping properties of the set of chairs is illustrated in Fig. 3A.

Conversely, the whole set may be ordinarily used as individual chairs of a set, such as a bridge set, or in groups standing together side by side, and on occasion, to save space, they may all be telescoped or nested into one chair.

In Figs. 14, 15, and 16, I have illustrated another construction of nesting chair of the type described hereinbefore. The chair comprises side walls 29—29 which as before may be made from ½" wood. A strip of material 30, which again may be "Randallite," is bent to conform to the edge contour of the sides, and is made wide enough as shown in said figures, to overlap and extend laterally outwardly beyond the side walls 29—29. Before applying this strip of material it is covered with covering material 31 which may be fabric but which, as a modification, may be leather or leather substitute, and the material 31 is folded over the opposite edges of the said strip as at 32—32 and laid upon the faces of the sides 29—29 and secured thereto in any suitable manner for example by tacks 33—33.

Depressed recesses are thus provided on the outer faces of the sides 29—29, and these recesses are filled by panels of wood or the like 34—34 which have previously been externally covered by leather or leather substitute; and the panels 34—34 may be secured in the recesses by any suitable means such as screws 35—35 projected outwardly through the sides 29—29, and into the said panels.

In side elevation such a chair appears as in Fig. 14 wherein one of the said panels is shown at 34 and the edge of the strip material is shown at 32 the entire exterior of the chair being thus covered by the leather or leather substitute material.

If desired of course padding may be provided between the leather cover and the parts supporting it.

As before, this chair is a downwardly open shell with a bottom peripheral edge, and a set of said chairs may be nested together as described.

In Figs. 17 and 18 is illustrated still another form of construction. A pair of spaced apart skeleton frames 36—36 is made. Each may be formed by bending a strip of wood such for example as birch into the contour of the chair as shown in Fig. 17. Bottom strips 37 are secured to the skeleton frame strips 36 and braces 38—38 may also be provided to stiffen this skeleton frame.

As best shown in Fig. 18 the strips 36 have each a groove 39 cut in its inner surface, and the bottom strip 37 has a like groove 40. Side walls 41—41 are inserted into these grooves, and secured therein by glue or like securing means.

The confronting faces of the pairs of bent strips 36—36 are provided with confronting grooves 42—42, and a sheet of material 43 is inserted at its edges in the grooves 42—42 and secured thereat for example by glue. The strip 43 thus, as will be understood without further drawing or description, provides the front wall, seat wall, back-rest wall and chair back wall.

Before inserting the side walls 41 and the said strip material in their grooves as described, their outer surfaces may if desired be covered respectively with covering material 44 and 45.

Here again padding material may be provided between the covering material 45 and the strip 43 and if desired also between the side covering material 44 and the sides 41; and again the chair thus constructed is a downwardly open shell, nestable with other chairs similarly constructed.

In Figs. 19 to 21 is illustrated another type of construction. Here a pair of spaced-apart skeleton frames 46—46 are bent into suitable configuration from angle section metal. Cross connecting angle section pieces 48—48 may be provided for stiffening purposes. A strip of material 49 which again may be "Randallite" is bent around the angle frame thus provided and secured thereto by rivets 50.

Covering material may then be applied to cover the entire chair frame and in this instance is illustrated as fabric 51.

To securely attach the fabric in position, it may be made as a slip cover and the bottom edge thereof secured to the bottom reaches 52 of the channel frames, and one means for so securing it is illustrated at 53—53 in Fig. 20, but best shown in Fig. 21 to enlarged scale. A strip of metal 53 is secured for example by rivets 55 to the said angle member 52 and having a lower edge 56 bent away from the angle piece 52. The fabric 51 extends downwardly and is folded over the edge 56 and carried upwardly as at 57 inside the strip 54. The strip 54 is then deformed by means of a hammer to bend it inwardly toward the angle piece 52 into the position shown in Fig. 20 thereby clamping the fabric between the strip and the angle piece, gripping it and holding it against accidental withdrawal.

This chair also as will be seen is a downwardly open shell for nesting purposes as described, and if desired it may as mentioned hereinbefore be upholstered with padding.

In Figs. 22, 23, and 24 is illustrated a construction by which the back-rest and the seat of the chair may be of the resilient spring type of construction. Spaced apart side walls 58—58 of wood or the like are provided. Strip material for example "Randallite" 59 is secured to the front edges of the sides to provide a front wall of the chair and terminates as at 60 adjacent the forward part of the seat portion. Similarly, a strip of sheet material 61 is secured to the sides and provides the back wall of the chair and terminates at 62 at the top of the back-rest portion.

A sheet metal strip 63 is connected to the terminus 62 of the sheet material and extends from side to side of the chair and is also secured to the sides by screws 64—64, and is provided with a series of perforations 65—65. A similar sheet metal strip 66 is provided at the terminus 60 of the sheet material and provided with a transverse series of perforations 67 and secured by screws 64A. A strip of metal 68 extending transversely of the chair is secured to the sides 58 and by screws 64B and disposed at approximately the juncture of the seat and back rest portions and provided with two transverse series of perforations 65A and 67A.

Springs 69—69 are anchored at one end in the perforations 65 and at the other end in the perforations 65A; and springs 70—70 are anchored at one end in the perforations 67 and at the other end in the perforations 67A; and provide a resilient back rest frame and a resilient seat portion frame.

A chair frame of downwardly open hollow frame construction is thus provided in which the back rest and the seat are composed of resilient springs. The frame may be covered with any suitable material such as fabric and between the fabric and the springs padding material may be disposed.

In Figs. 25 to 28 inclusive is illustrated both a modification type of construction and a modified external form of nesting chair.

The external appearance of the chair may be that shown in Fig. 25 wherein as shown the lower skirt portion has been cut out on the sides and the front and back thereof by deep vertical recesses leaving legs at the corners, the recesses in the side walls being shown at 72—72 and the recesses at the front and back walls being shown at 73 and 74 leaving legs 75—75.

Since the general plan configuration is as described hereinbefore rectangular, the said legs 75—75 will thus be of angle section form. The general nesting properties of the chair will, as is apparent, be the same as those described hereinbefore for chairs having a complete lower skirt portion and a complete bottom peripheral edge.

A chair of this form may be constructed as hereinbefore described, or may have the particular construction illustrated for it in Figs. 26, 25, and 28.

This particular construction comprises spaced-apart side walls 76; and front and back wall portions 76 and 77 terminating respectively at 78 and 79 below the level of the seat portion. Sheet material 80 which again may be "Randallite" is bent as before to the desired configuration and provides the remainder of the front wall, the seat wall, the back-rest wall and part of the back wall, the lower edges of the "Randallite" being inserted into grooves 81 and 82 respectively in the front and back wall portions 76 and 77. Fabric 83 may be provided to cover the "Randallite" and may be inserted into the grooves 81 and 82 before the "Randallite" is inserted thereinto so that it is secured in the grooves. The grooves may be coated with glue to make the connection at these points permanent.

The "Randallite" sheet 80 may as shown in Fig. 27 overlap the side walls 76, and the fabric 83 may extend over the side edge of the "Randallite" and between the "Randallite" and the side walls as at 84, to secure it in position. Upholsterer's padding 85 may be placed between the fabric and the "Randallite."

In Fig. 35 is shown another form of nesting chair. The construction of the chair may be the same as described hereinbefore; and its form is the same except that openings 85 are cut out of the side walls 86—86, for design purposes; such a chair obviously may be nested with other similar chairs as will be understood from the foregoing descriptions.

The nesting chairs described hereinbefore are of such form that the general plan configuration is rectangular. In Figs. 32, 33, and 34, is illustrated a nesting chair embodying my invention in which the general plan configuration is circular. Details of construction of this chair are not shown in the drawing, the cross sectional views Figs. 33 and 34 showing the chair as if it were molded all in one piece; and in this respect therefore these views are diagrammatic. It is contemplated, however, within the scope of my invention, that nesting chairs of rectangular plan configuration may be molded all in one piece from suitable material such as plastic or plastic impregnated material, as indicated for example in Figs. 29 and 30 which figures show such a construction in addition to indicating diagrammatically the structural characteristics described hereinbefore in connection with these figures. Figs. 32 to 34 inclusive, therefore may, besides illustrating somewhat diagrammatically a chair of circular plan configuration, be taken also to illustrate a chair of such configuration molded all in one piece.

Obviously such circular chairs will nest one within the other for the purposes hereinbefore referred to and it is believed that this will be clear without further illustration or description.

In Figs. 37, 38, and 39 is illustrated a nesting chair which may be constructed according to any of the several types of construction described hereinbefore, this chair being different from the other chairs in that its general plan configuration is that of a trapezium as plainly shown in Fig. 38, and as indicated in Fig. 37. Chairs of this form may be downwardly open shells so that they will be nested by telescoping one within another, and the provision of the tapering plan configuration contemplates the grouping of a set of such chairs after they have been unnested, in generally arcuate groups, one such group for four nesting chairs being illustrated in Fig. 40 where they are disposed side by side adjacent to each other.

In some cases it may be desired that the outermost chair of a set of nesting chairs, besides covering and concealing the chairs nested therewithin, will still further camouflage the fact that chairs are nested therewithin, by giving to the outermost chair the appearance of a more luxurious chair, and this has been shown in Figs. 41 and 42, wherein such an outermost chair is illustrated. This chair besides being upholstered on the seat and back rest 87 and 88 respectively, has such upholstering tufted as indicated at 89, and arms 90—90 are also provided; and at the bottom of the chair as at 91 it is provided with a fringe on the lower portion of the outer fabric covering. Thus the outermost chair may have the design and appearance of a so-called period chair.

The frame construction of the chair may be any of those types of construction illustrated and described hereinbefore suitable for the purpose, and the arms 90—90 may be attached to the side walls of the chair by forming them as shown in Fig. 42 and attaching them by screws 92.

Hereinbefore the chairs have been illustrated and described as being nested one within the other by telescoping one chair downwardly over another. In Figs. 36 and 43 is illustrated generally a chair nestable with other like chairs and embodying a part of my invention, but in which one chair can be nested within another without first raising it to as high a level as would be necessary with the previously described chairs.

In this chair the side walls 93—93 may have secured thereupon a sheet material strip 94 such as "Randallite," which may provide in one piece the front wall 95, the seat wall 96, the back-rest wall 97, and a back wall 98 which terminates, hook-like, near the top of the back. The remainder of the back of the chair is open as plainly shown in Fig. 36.

Referring now to Fig. 43, to nest the chair 99 with a like chair 100, the chair 99 may be moved horizontally along the floor toward the chair 100 partially nesting the sides, front and seat of one with that of the other, and then the rear portion of the chair 99 may be raised sufficiently to hook the uppermost portion of the back of the chair 99 over the corresponding portion of the chair 100.

My invention is not limited to the exact form and construction of shell, nor to the exact process for making it illustrated and described, nor is it limited necessarily to chairs, inasmuch as it may be applied to sofas, settees, and other classes of furniture, as will be apparent, and my invention comprises all modifications and changes which may be made as departures from the foregoing specific disclosure, which come within the scope of the appended claims.

I claim:

1. A set of chairs comprising an outer chair of downwardly open shell form having a hollow back rest portion and a seat portion projecting forwardly therefrom; and an inner chair having a back rest portion and a seat portion and similar in form to the outer chair but of smaller transverse external dimensions, and nestable within the outer chair and when so nested being substantially concealed thereby.

2. A set of chairs comprising an outer chair of downwardly open shell form having a hollow back rest portion and a seat portion projecting forwardly therefrom; and a plurality of inner mutually nested chairs all nested in and covered by the outer chair; each inner chair being of the same outer form as the outer chair but of smaller transverse external dimensions than the chair within which it is nested.

3. A set of chairs comprising a plurality of inner mutually nested chairs all nested within an outer chair; the outer chair being of downwardly open shell form comprising a hollow back portion and a seat portion projecting forwardly therefrom; the shell walls of the outer chair covering the inner chairs; each inner chair being of the same outer form as the outer chair but of smaller transverse external dimensions than the chair within which it is nested.

4. A plurality of chairs adapted to be nested, each chair including a seat portion and means for supporting said seat portion in spaced relation from a floor, and a chair back comprising a front wall extending upwardly from the rear edge of said seat portion and a rear wall extending from the top of said front wall in spaced relation thereto to the floor providing a space between said walls whereby a substantially similar cooperating chair having a slightly smaller seat portion and its back walls spaced slightly nearer together than the corresponding parts of the larger chair may be nested within said larger chair with the seat portion of the smaller chair disposed below the seat portion of the larger chair and its back walls disposed between the back walls of said larger chair.

5. A plurality of chairs adapted to be nested, each chair including a front wall merging with a seat portion at its top margin and means for supporting said seat portion in spaced relation from a floor, and a chair back formed integrally with said front wall and seat portion comprising two spaced back walls connected at their top margins, the rear one of said spaced back walls extending from the top to the floor, providing a space between said back walls whereby a substantially similar cooperating chair having a slightly smaller seat portion and its back walls spaced slightly nearer together than the corresponding parts of the larger chair may be nested within said larger chair with the seat portion of the smaller chair disposed below the seat portion of the larger chair and its back walls disposed between the back walls of said larger chair.

6. Chairs adapted to be nested, each chair including means providing a seat portion and back-rest means, and including spaced side walls, and a front wall connected across front margins of said side walls, said seat portion being disposed on upper margins of said side walls, and said back-rest means being disposed rearwardly of said seat portion and comprising front and rear spaced walls, said front wall, said seat portion and said front and rear walls of said back-rest means being integrally formed and bent to desired form, said front and rear walls of said back-rest means providing a space therebetween rearwardly of said seat portion whereby a substantially similar cooperating chair having a slightly smaller seat portion and having its side walls spaced slightly nearer together than the side walls of the larger chair and having the front and rear spaced walls of its back-rest means spaced slightly nearer together than the corresponding parts of the larger chair may be nested within said larger chair with the seat portion of the smaller chair disposed below the seat portion of the larger chair and with its back-rest means disposed in said space within the back-rest means of said larger chair.

7. A chair in the form of a hollow downwardly open shell comprising a front wall, a seat wall, a back-rest wall, and a back wall spaced from the back-rest wall, and spaced apart side walls, the hollow interior being of substantially the same form as the exterior; and the front wall, seat wall, back-rest wall, and back wall comprising a continuous strip of bent sheet material secured to the side walls.

8. A chair in the form of a hollow downwardly open shell comprising a front wall, a seat wall, and a back-rest wall, and spaced apart side walls, the hollow interior being of substantially the same form as the exterior; and the front wall, seat wall, and back-rest wall comprising a continuous strip of bent sheet material, secured to the side walls.

9. A chair in the form of a hollow downwardly open shell comprising a front wall, a seat wall, and a back-rest wall, and spaced apart side walls, the hollow interior being of substantially the same form as the exterior; and the front wall, seat wall, and back-rest wall comprising sheet material bridging and secured to the side walls.

10. A chair in the form of a hollow downwardly open shell comprising a front wall, a seat wall, a back-rest wall, and a back wall spaced from the back-rest wall, and spaced apart side walls, the hollow interior being of substantially the same form as the exterior; and the front wall, seat wall, back-rest wall, and back wall comprising sheet material bridging and secured to the side walls.

11. A chair in the form of a hollow downwardly open shell comprising a front wall, a seat wall, a back-rest wall, a back wall spaced from the back-rest wall, a top wall extending from the top of the back-rest wall to the top of the back wall, and opposite spaced apart side walls; the front wall, seat wall, back-rest wall, top wall, and back wall terminating transversely at the opposite side walls and secured thereto and the side walls terminating upwardly at the top wall and seat wall and terminating forwardly and rearwardly at the back wall, back-rest wall, and front wall; the hollow interior being of substantially the same form as the exterior and providing a transversely unobstructed interior space whereby the chair may be telescoped over and nested with a like chair of similar external form but of smaller transverse dimensions.

12. A set of chairs comprising an outer chair of downwardly open shell form having a back wall, a back-rest wall spaced forwardly from the back wall, a seat wall projecting forwardly from the back-rest wall and a front wall below the seat wall; and inner chair having similar walls and similar in form to the outer chair but of smaller transverse external dimensions and nestable within the outer chair.

13. A set of chairs comprising an outer chair of downwardly open shell form having a back wall, a back-rest wall spaced forwardly from the back wall, a seat wall projecting forwardly from the back-rest wall, and a front wall below the seat wall; and a plurality of inner mutually nested chairs all nested in and covered by the outer chair; each inner chair being of the same outer form as the outer chair but of smaller transverse external dimensions than the chair within which it is nested.

14. A set of chairs comprising a plurality of inner mutually nested chairs all nested within an outer chair; the outer chair being of downwardly open shell form comprising a back wall, a back-rest wall spaced forwardly from the back wall, a seat wall projecting forwardly from the back-rest wall, and a front wall below the seat wall; the shell walls of the outer chair covering the inner chairs; each inner chair being of the same outer form as the outer chair but of smaller transverse external dimension than the chair within which it is nested.

ROBERT H. JAMES.

REFERENCES CITED

The following references are of record in the file of this patent:

UNITED STATES PATENTS

| Number | Name | Date |
| --- | --- | --- |
| 1,886,172 | Doetsch | Nov. 1, 1932 |
| 1,825,368 | Scully | Sept. 29, 1931 |
| 1,716,746 | Tyner | June 11, 1929 |
| 1,222,089 | Ferry | Apr. 10, 1917 |
| 1,780,570 | Stephens | Nov. 4, 1930 |

FOREIGN PATENTS

| Number | Country | Date |
| --- | --- | --- |
| 712,796 | French | Aug. 3, 1931 |

OTHER REFERENCES

New York Times Magazine (page 18, copy in Div. 8, U. S. Patent Office), Jan. 27, 1929, UX155–193.